(12) United States Patent
Fabry et al.

(10) Patent No.: US 7,452,514 B2
(45) Date of Patent: Nov. 18, 2008

(54) DEVICE AND METHOD FOR CONVERTING CARBON CONTAINING FEEDSTOCK INTO CARBON CONTAINING MATERIALS, HAVING A DEFINED NANOSTRUCTURE

(75) Inventors: Frédéric Fabry, Le Cannet (FR); Eusebiu Grivei, La Hulpe (BE); Nicolas Probst, Brussels (BE); Richard Smet, Aartselaar (BE); Jean-Yves Peroy, Angoustrine (FR); Gilles Flamant, Llo (FR); Lauent Fulcheri, Mouans-Sartoux (FR); Patrick Leroux, LeCannet (FR); Francis Fischer, Sins (CH)

(73) Assignee: Timcal SA, Bodio (CH)

( * ) Notice: Subject to any disclaimer, the term of this patent is extended or adjusted under 35 U.S.C. 154(b) by 736 days.

(21) Appl. No.: 10/380,647

(22) PCT Filed: Sep. 19, 2001

(86) PCT No.: PCT/EP01/10835

§ 371 (c)(1),
(2), (4) Date: Sep. 22, 2003

(87) PCT Pub. No.: WO02/24819

PCT Pub. Date: Mar. 28, 2002

(65) Prior Publication Data

US 2004/0045808 A1    Mar. 11, 2004

(30) Foreign Application Priority Data

Sep. 19, 2000    (EP)    .................................. 00120115

(51) Int. Cl.
*B01J 19/08* (2006.01)
(52) U.S. Cl. ............... 422/186.21; 204/173; 423/445 R

(58) Field of Classification Search ................. 204/173; 422/186.21; 423/445 R
See application file for complete search history.

(56) References Cited

U.S. PATENT DOCUMENTS 3,288,696 A    11/1966    Orbach ........................ 204/173
3,408,164 A  *  10/1968   Johnson ..................... 423/449.2

(Continued)

FOREIGN PATENT DOCUMENTS

FR    2764280    12/1998

(Continued)

OTHER PUBLICATIONS

International Search Report for PCT/EP01/10835 dated Feb. 21, 2002.

(Continued)

*Primary Examiner*—Kishor Mayekar
(74) *Attorney, Agent, or Firm*—Finnegan, Henderson, Farabow, Garrett & Dunner, LLP

(57) ABSTRACT

Apparatus and process for producing carbon black or carbon containing compounds by converting a carbon containing feedstock, comprising the following steps: generating a plasma gas with electrical energy, guiding the plasma gas through a venturi, whose diameter is narrowing in the direction of the plasma gas flow, guiding the plasma gas into a reaction area, in which under the prevailing flow conditions generated by aerodynamic and electromagnetic forces, no significant recirculation of feedstock into the plasma gas in the reaction area recovering the reaction products from the reaction area and separating carbon black or carbon containing compounds from the other reaction products.

29 Claims, 2 Drawing Sheets

U.S. PATENT DOCUMENTS

| | | | | |
|---|---|---|---|---|
| 5,110,576 | A | 5/1992 | Soeda et al. | 423/445 |
| 5,527,518 | A * | 6/1996 | Lynum et al. | 423/449.1 |
| 5,989,512 | A * | 11/1999 | Lynum et al. | 423/456 |
| 5,997,837 | A | 12/1999 | Lynum et al. | 423/450 |
| 6,099,696 | A * | 8/2000 | Schwob et al. | 204/173 |
| 6,358,375 | B1 | 3/2002 | Schwob | 204/173 |
| 6,395,197 | B1 * | 5/2002 | Detering et al. | 252/373 |

FOREIGN PATENT DOCUMENTS

| | | |
|---|---|---|
| JP | 6322615 | 11/1994 |
| WO | WO 93/12030 | 6/1993 |
| WO | WO 93/20154 | 10/1993 |
| WO | WO 94/17908 | 8/1994 |
| WO | WO 97/03133 | 1/1997 |
| WO | WO 98/55396 | 12/1998 |

OTHER PUBLICATIONS

International Preliminary Examination Report for PCT/EP01/10835 dated Feb. 5, 2003.

* cited by examiner

DEVICE AND METHOD FOR CONVERTING CARBON CONTAINING FEEDSTOCK INTO CARBON CONTAINING MATERIALS, HAVING A DEFINED NANOSTRUCTURE

This application is a 35 U.S.C. 371 National Stage of International application PCT/EP01/10835 filed Sep. 19, 2001.

The invention relates to a process and apparatus for converting carbon containing feedstock, into carbon black or other carbon containing materials, particularly one having a defined nanostructure.

More than 99% of the carbon black is presently produced by incomplete combustion processes. By far, the dominant process is a furnace process developed sixty years ago. Other processes include channel, thermal and lamp processes. All these industrial processes are characterized by the combustion of about 40% to 60% of the feedstock or raw material to generate the necessary heat to crack the rest of the feedstock. Even though more than 100 different grades of carbon black are currently offered by commercial manufacturers, each grade has different specifications and properties designed to suit particular applications. Further, the production of new materials is limited by the process chemistry. i. e., chemical composition and available energy.

About six million MT (metric tons) of carbon black are produced worldwide annually. The raw materials used as feedstock include decant oil for the low quality material (tire manufacturing), pyrolysis fuel oil (PFO) and coal tar distillates. Self-decomposition of acetylene is performed to produce high carbon black grade (40 000 MT) mainly used in battery manufacturing. Pollutant emission resulting from the 12 million MT of oil used to produce the carbon black is 22 million MT $CO_2$ and millions of MT of $SO_X$ and $NO_X$.

PCT/NO92/00196 and PCT/NO96/00167 disclose DC carbon electrode plasma reactors which produce hydrogen as a primary product and carbon black material as a secondary product. No evidence has been given that these processes can produce carbon black on a commercial scale.

PCT/EP94/00321 discloses a plasma reactor with three electrodes, creating a compound arc by applying an AC current to the electrodes. The feedstock is fed into the reactor by passing it through an arc zone. According to this disclosure, the reaction zone, wherein the feedstock is converted into carbon compounds. Namely into carbon black, is directly below and adjacent to the arc zone. The feedstock at least partly circulates through the arc zone. The carbon black produced by this process is a mixture of carbon materials originated by the various heat treatments. This process allows the production of different carbon black materials with different nanostructures.

SUMMARY OF THE DISCLOSURE

A process and apparatus are disclosed for producing carbon black with well-defined properties, allowing control of operating conditions and process parameters to obtain high conversion efficiency of feedstock and reproducible product quality.

Furthermore, a new carbon black material is also disclosed.

The control of the operating conditions for the production of carbon black with well-defined properties includes the preventing of circulation of the feedstock and any products through the arc zone thus producing carbon black materials with well defined and consistently reproducible properties. In particular a venturi allows a better control of the reaction temperature and a more efficient mixture in the "low temperature region" of the reaction zone, where the carbon black is produced.

The process and apparatus work with inexpensive and readily available carbon containing feedstocks. More specifically, materials with low combustion enthalpy, e.g., below 80 BMCI (Bureau of Mines Correction Index), including recycling oil from tire pyrolisis, can be used as feedstocks.

One disclosed process comprises: creating a plasma by directing plasma gas through an electric arc; passing or guiding the plasma gas through a venturi zone, whose diameter narrows into a throat in the direction of the plasma gas flow; passing or guiding the plasma gas into a reaction zone, having a diameter greater than the throat of the venturi zone; injecting the feedstock into the plasma gas in the reaction zone downstream of the venturi zone (after it has passed the throat of the venturi zone); extracting the reaction products from the reaction zone; and recovering the carbon black. It is also possible to inject the feedstock into the throat of the venturi and/or slightly above the venturi.

The carbon black is separated from the other reaction products and has a defined nanostructure. This nanostructure morphology and texture depends on the operating conditions and are therefore controllable.

The plasma gas is injected into the reactor space, not necessarily through the plasma arc. In a preferred embodiment, the electric arc is a compound arc, created by at least three electrodes. Preferably, the electrodes are graphite based electrodes and the arc is created by connecting a sufficient AC power source to the electrodes. The current frequency can be the frequency of the grid using a conventional power source (50-60 Hz) or it can be higher using a high frequency power switching source. An increase in the frequency can increase the arc stability, particularly when using hydrogen as the plasma gas. In this case, the current frequency is preferably between 500Hz to 10kHz.

The venturi preferably is made from a graphite based material and is formed as a cone. The downstream side of the venturi is preferably formed as an edge and therefore building an abruptly expanding zone. An edge between the throat and the abruptly expanding zone causes an abrupt expansion of the plasma gas volume. This is the preferred means to prevent back-flow of carbon containing material into the area upstream of the venturi zone outlet, particularly into the plasma forming region, e. g., into the arc or arcs. The expanding zone also generates a high turbulence zone in the flow that is used to increase the mixing efficiency between the plasma flow and the feedstock and to realize a homogeneous mixture and a better control of the reaction temperature.

The feedstock may comprise or consist of methane, acetylene, ethylene, propylene, $C_4$-hydrocarbons including butadiene, light or heavy oil, even waste oil and/or pyrolysis fuel oil (PFO), as well as any other material comprising carbon and mixtures of the above. Preferably, essentially no oxygen or oxygen containing materials are fed into the arc or into the reactor. Feedstocks containing limited amounts of oxygen in the molecule, e.g. with an atomic ratio of oxygen:carbon of up to 1:6 could be used.

Preferably, the plasma gas is injected axially above the electrodes, in order to pass directly through the arc. The plasma gas itself may preferably comprise or consist of hydrogen, nitrogen, carbon monoxide, argon, helium or any other suitable gas as well as any mixture of the preceding materials, e.g. a mixture of up to 50 vol % CO and hydrogen. The off-gas contains in addition to the plasma gas components essentially solely hydrogen, methane, acetylene and ethylene and thus is relatively independent of the hydrocarbon feedstock. If oxygen compounds are used, some CO and a very small amount of $CO_2$ are contained in the off-gas.

Preferably, a part of the off-gas is recycled and used as plasma gas. This is particularly advantageous, if the recycled off-gas is composed essentially solely of hydrogen and traces of hydrocarbons.

The temperature in the reaction zone is controlled preferably within a range between 900° C and 3000° C, by adjusting the plasma gas flow rate, the electrical energy and the feedstock flow rate.

The feedstock is injected through at least one injector, preferably through two to five injectors. These injectors can be distributed equally around the circumference of the reaction zone. The injection of the feedstock can be radially inwards towards the center of the plasma gas flow or with a substantial tangential and/or axial component into the outer zone of the plasma gas flow or the reaction zone to generate a vortex-like flow. The injection rate is adjusted to the desired reaction temperature depending on the flow of the hot plasma gas and the nature of the feedstock. A preferred range is from about 1 to about 10 kWh in the plasma gas per about 1 kg of carbon in the feedstock.

The reaction products are of a specifically good quality, when the process is performed without the use of oxygen.

In one embodiment, carbon black and hydrogen are produced as useful products. The disclosed process allows the production of a variety of products.

A disclosed method is preferably performed in a reactor for converting feedstock, comprising carbon within a plasma into carbon compounds having a defined nanostructure. The method is carried out in a reactor comprising:

(a) a head portion comprising at least two electrodes and a plasma gas supply, for creating an electric arc between the electrodes when a sufficient electric power is supplied, thus creating an arc zone, (b) a venturi portion and (c) a reaction chamber, comprising at least one feedstock injector, wherein the venturi portion is placed between the arc zone and the feedstock injector and narrows towards the reaction chamber.

The reactor is preferably of cylindrical shape. The chamber itself, at least at its inner surface, may be preferably made from graphite containing material.

When producing nanostructured carbon material with a disclosed process, one finds that the structure and quality of the reaction products depends completely on the process parameters, mainly on the reaction temperature and on the residence time, but is surprisingly quite independent of the feedstock. This is the reason, why even methane or waste oil or various feedstock mixtures can be used to create high quality carbon materials with a defined nanostructure.

The carbon black disclosed herein is characterized by having a negative difference (commonly called "porosity") between nitrogen surface area ($N_2SA$) and the specific surface area of the carbon black exclose of area contained in micropore, to small to admit (cetyltrimethyl ammonium bromide or CTAB) or the CTAB surface area (CTABSA), and an intrinsic density below 1.9, preferable below 1.8, particularly between 1.5 and 1.9 g/cm³. Thus $N_2SA < CTAB\ SA$ especially:

$-20\ m^2/g \leq N_2SA - CTAB\ SA < 0\ m^2/g.$

The preferred carbon black has a nitrogen surface area from 5 to 100 m²/g and a DBP (di—butyl phthalate oil) absorption from 30 to 300 ml/100g. The use of CDBP below refers to DBP absorption with a compressed sample.

The disclosed carbon black has the advantage of having a low density. In, e. g., tire applications, this results in a reduction of the needed weight of carbon black and in an overall weight reduction of the final rubber product. Another application of the new carbon blacks lies in dry cell electrodes.

The various properties of the carbon black herein claimed and illustrated are measured by the following standard procedures:

| | |
|---|---|
| Nitrogen surface area ($N_2SA$): | ASTM D3037-93 |
| CTAB SA: | ASTM D3765-92 |
| DBP absorption: | ASTM D2414-93 |
| CDBP absorption: | ASTM D3493 |
| Intrinsic density by Xylene | DIN 12797 |
| | (2.5 g carbon black at 15 torr) |
| Iodine number | ASTM D1510 |
| Sulfur content: | ASTM D1619 |
| Ash content: | ASTM D1506 |
| pH: | ASTM D1512 |
| Toluene discoloration | ASTM D1618 |

BRIEF DESCRIPTION OF THE DRAWINGS

Additional features and embodiments are described in the following detailed description and with reference to the drawings herein:

FIG. 1 illustrates schematically a complete reactor set-up for performing the disclosed method; and FIG. 2 is a detailed view of the upper part of the reactor of FIG. 1.

DETAILED DESCRIPTION OF THE PRESENTLY PREFERRED EMBODIMENTS

Figure 1:
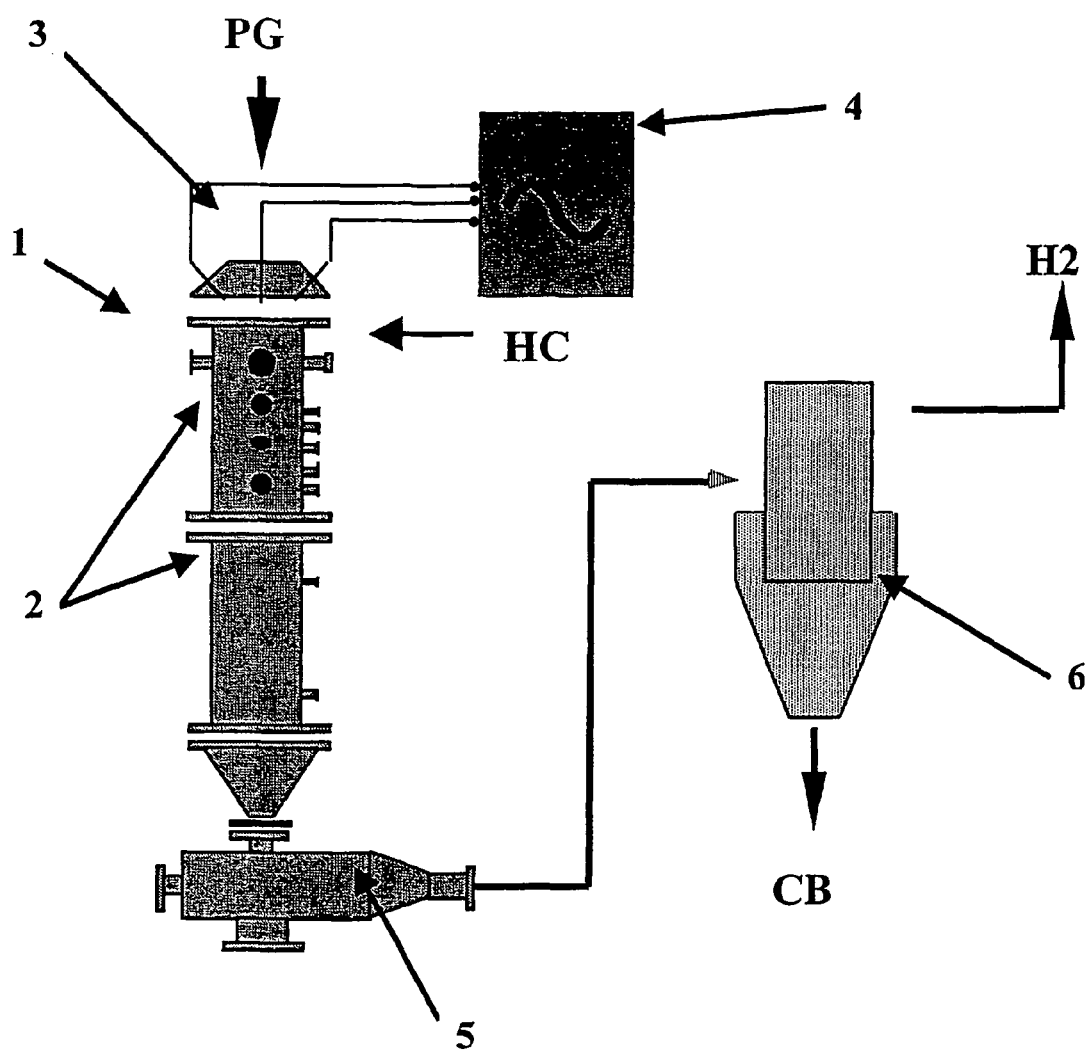
FIGS. 1 to 2 show a preferred embodiment of the reactor of the invention.

FIG. 1 shows the reactor 1 comprising a reactor chamber 2 of cylindrical shape, the interior walls are made out of graphite. The head section 3 of the reactor defines the upper end. Three electrodes 8 are mounted at the head section 3, are connected to a power supply 4, being able to deliver a three phase AC current. The current frequency can be the network frequency (50 to 60 Hz) or any higher frequency. The lower end of the reactor chamber 2 is connected to extraction means 5, through which the reaction products are removed from the reactor. These are directed to standard separation means 6 e.g. cyclones and/or filters, wherein the carbon black is separated from hydrogen and other reaction products.

Figure 2:
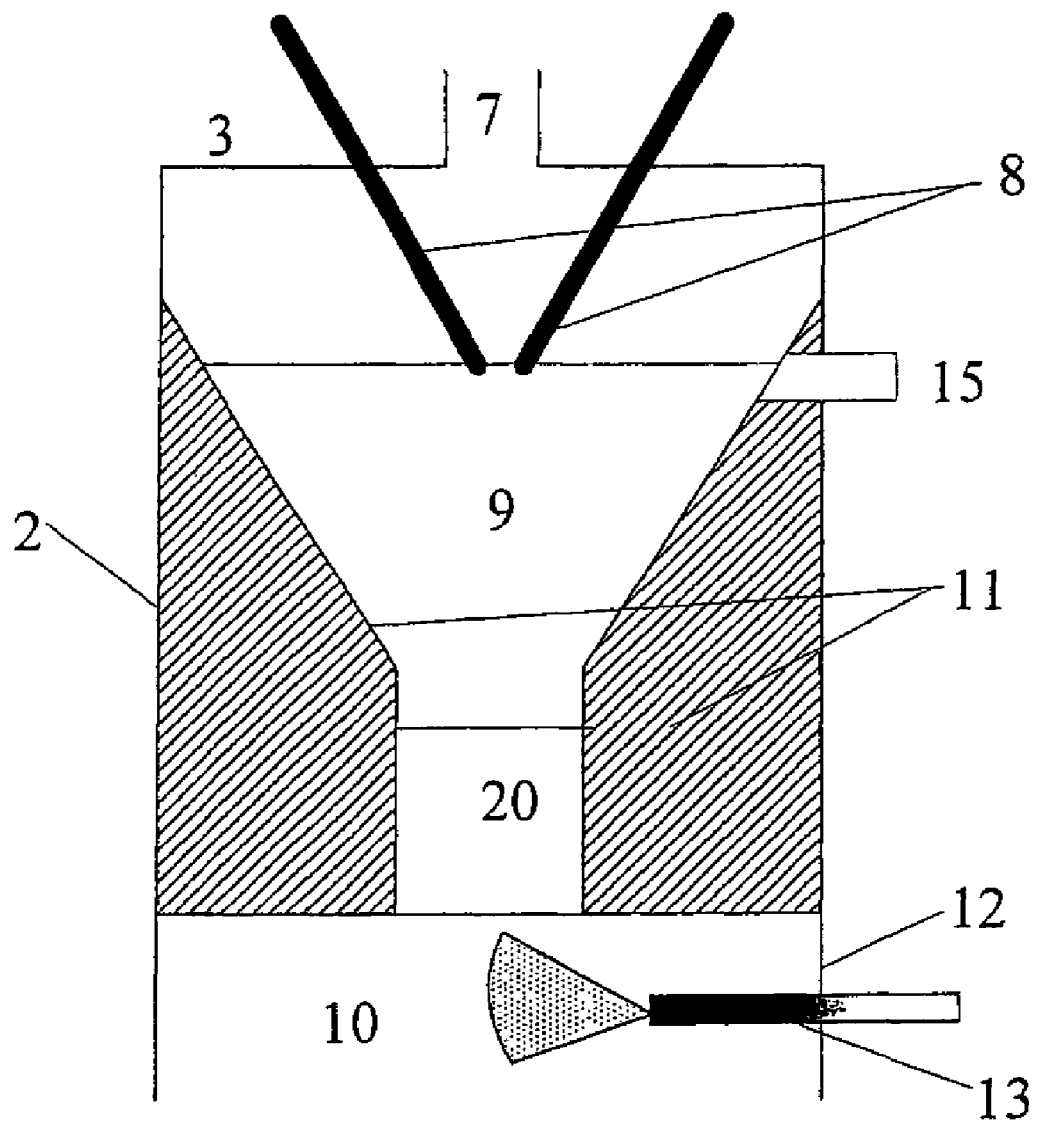

A more detailed view of the upper part of the reaction chamber 2 is shown in FIG. 2. Plasma gas, preferably hydrogen, nitrogen, carbon monoxide, argon or a mixture thereof is fed into the reaction chamber 2 through the centre of head section 3 via an inlet 7. The plasma gas flow rate was adjusted depending on the nature of the plasma gas and the electrical power between about 0.001 Nm³/h and about 0.3 Nm³/h per kW of electric power. Three graphite electrodes 8 (two are shown in FIG. 2), connected to the power supply 4, are mounted to the head section 3. The tips of these electrodes are close enough together to ignite an electric compound arc in the presence of the plasma gas, when a sufficient power source is connected to the electrodes. As a result, a plasma is created within the arc zone 9. The temperature of this plasma is controlled by the plasma gas flow and the electric power, supplied to the electrodes 8. The arc zone may be optically controlled through an opening 15. This allows an automatic control of the temperature and/or the quantity of the plasma gas flowing into the reaction zone.

Below the arc zone 9, a venturi element 11, made of graphite, is located inside the reactor 1. The speed of the plasma gas flow is increased when passing the narrow passage or throat 20 of the venturi element 11.

The plasma gas then enters the reaction zone 10 after passing the venturi element 11 expanding abruptly, as the lower end of the venturi is formed as a sharp edge and not as a continuous widening section. Into the reaction zone 10, the feedstock is injected through an injector 13, located within the wall 12 of the reactor chamber 2 just below the venturi 11. The injection of the feedstock after the venturi improves the mixing between the plasma gas and the feedstock.

Preferably, the feedstock is injected through 2 to 5 injectors 13 directly or radially towards the center of the reaction zone 10. Alternatively, the feedstock may also be injected in a more tangential manner, thus entering the reaction zone 10 off centre or with a certain angle co or contra-flow.

The energy, necessary to control depends upon the reaction process, the flow rate and nature of the feedstock, and is controlled via the plasma gas temperature and/or the plasma gas flow and the power, supplied to the electrodes 8 by the power supply 4.

The pressure preferably is slightly above atmospheric pressure to prevent any inleaking of oxygen. The carbon yield may even reach 100% when the input energy (plasma flow plus electrical power) is sufficiently high. Carbon black structure can be decreased by injection of small quantities of alkaline salts. Typically, also a quench zone can be used, where e.g. methane or other suitable quench materials can be introduced.

In addition to converting carbon containing materials into carbon with a defined nanostructure, hydrogen of good quality is also a useful reaction product, when carrying out the process without the injection of oxygen. This hydrogen may therefore also be separated. Methane or natural gas are particularly attractive feedstocks when the production of carbon compounds, particularly carbon black, and the production of hydrogen are envisioned. Ethane, ethylene, propane, propylene, butanes, butylenes and mixtures thereof are further examples of useful feedstocks.

In the following examples, feature combinations and embodiments of this invention are illustrated.

The examples were carried out in a reactor set-up substantially as shown in FIGS. 1 and 2. A plasma power supply employing a three phase electricity source up to 666 Hz with a maximum power of 263 kVA and a current range of up to 400 A was used to supply electricity to three graphite electrodes having their tips at the apices of an isosceles triangle.

EXAMPLE 1

In the reactor described, a plasma was generated at a nitrogen flow of 9 $Nm^3.h^{-1}$. The plasma was operated at a current of 200 A. As a hydrocarbon feedstock a pyrolysis fuel oil was employed at a flow rate of 2 $kg.h^{-1}$. The pyrolysis fuel oil (PFO) was fed to the reactor together with an argon carrier gas of 0.5 bar pressure from a tank which was under pressure between 0.75 and 1 bar. The injector was located 2 cm into the graphite reactor wall.

The carbon black formed was removed in a primary and a secondary filter.

EXAMPLE 2

In this example 0.56 $Nm^3.h^{-1}$ of ethylene was used as a feedstock. The plasma used was again a plasma with nitrogen gas at 9 $Nm^3.h^{-1}$ at 200 A. The injection of feedstock done in cycles of 5 minutes; 290 g of carbon black was obtained in the filter.

EXAMPLE 3

In this example, the conditions were similar to the previous example with a continuous injection of ethylene at a rate of 0.56 $Nm^3/h$ during 30 minutes.

EXAMPLE 4

In this example, again under process conditions corresponding to those of the previous example. In this experiment ethylene at a rate of 0.56 $Nm^3.h^{-1}$ was injected for sixteen minutes. The plasma gas flow was nitrogen at a rate of 9 $Nm^3.h^{-1}$.

EXAMPLE 5

In this example, again under process conditions corresponding to those of the previous examples. In this experiment methane at a rate of 0.6 $Nm^3.h^{-1}$ was injected for ninety minutes. The plasma gas flow was nitrogen at a rate of 12 $Nm^3.h^{-1}$ and the current 250 A.

The carbon black obtained from tests according to examples 1 to 5 was tested with respect to the usual properties. The results are shown in table 1. In all examples, the carbon yields were high; it was always possible to reach 100%, e.g. by adjusting energy and feedstock flow.

TABLE 1

| Carbon black properties | | | | | |
|---|---|---|---|---|---|
| | Example 1 | Example 2 | Example 3 | Example 4 | Example 5 |
| BET ($m^2/g$) | 69 | 75.1 | 74.6 | 76 | 69 |
| CTAB ($m^2/g$) | | 95.7 | 90.9 | | |
| $I_2$ ($m^2/g$) | | 95.2 | 91.9 | | |
| DBP (ml/100 g) | 218 | 210 | 224 | 206 | 221 |
| CDBP (ml/100 g) | 94 | 125 | 124 | 127 | 121 |
| pH | 7.5 | 8.98 | 8.96 | 8.86 | 7.76 |
| Ash (%) | 0.08 | 0.32 | 0.28 | | |
| C-yield | 100 | 80 | 75 | 85 | 60 |
| Toluene disc. (%) | | 72 | 80 | 87 | |
| Sulfur | 0.04 | 0.036 | 0.074 | | |

The carbon blacks claimed with this invention and obtained by performing the claimed method using the claimed apparatus were tested in standard rubber compositions ASTM 3191 and in typical battery electrode applications in addition. Tables 2 to 6 show the data, resulting from those tests.

The carbon blacks IRB#7, N-234 and Ensaco 250 are standard carbon blacks. Their properties are presented also in order to allow a comparison with the carbon blacks according to the invention. These are shown as Examples A to D, whereas Example D is the same carbon black as the one of Example 1 of Table 1. The carbon blacks of Examples A to C have been obtained with slightly different process conditions.

TABLE 2

| Carbon Black | IRB#7, N-234 | Ensaco 250 | Example A | Example B | Example C | Example D (equals Example 1 of table 1) |
|---|---|---|---|---|---|---|
| Process Feedstock | Furnace Decant, PFO, Coal tar | MMM PFO | Plasma CH4 | Plasma C8H8 | Plasma C2H4 | Plasma PFO |

TABLE 3

| Carbon black | IRB#7 | N-234 | Ensaco 250 | Ex. A | Ex. B | Ex. C | Ex. D |
|---|---|---|---|---|---|---|---|
| Nitrogen S.A. ($m^2/g$) | 80 | 125 | 65 | 65 | 52 | 80 | 69 |
| DBP Abs. (ml/100 g) | 102 | 125 | 190 | 157 | 153 | 232 | 218 |

Viscosity and Rheometer Data

TABLE 4

| Carbon black | IRB#7 | N-234 | Ensaco 250 | Ex. A | Ex. B | Ex. C | Ex. D |
|---|---|---|---|---|---|---|---|
| ML 1 + 4, 100° C. | 83.6 | 98.3 | 103.4 | 85 | 73.4 | 107 | |
| Rheometer at 160° C. | | | | | | | |
| Min. Torque (dNm) | 2.91 | 3.71 | 4.11 | 3.03 | 2.36 | 4.34 | 2.77 |
| Max. Torque (dNm) | 21.27 | 26.62 | 23.42 | 22.61 | 19.48 | 26.59 | 22.37 |
| Δ Torque (dNm) | 18.36 | 22.91 | 19.31 | 19.58 | 17.12 | 22.25 | 19.60 |
| T90 (minutes) | 14.5 | 14.96 | 20 | 9.34 | 15.56 | 9.57 | 14.21 |

TABLE 5

| Carbon black | IRB#7 | N-234 | Ensaco 250 | Ex. A | Ex. B | Ex. C | Ex. D |
|---|---|---|---|---|---|---|---|
| Stress-strain on S2 at 500 mm/min | | | | | | | |
| Tensile strength Mpa | 28.5 | 31.5 | 25 | 23.8 | 20.4 | 24.7 | 21.4 |
| Modulus 100% (MPa) | 3.6 | 3.5 | 3.3 | 3.3 | 2.6 | 3.9 | 3.2 |
| Modulus 200% (MPa) | 10.5 | 10.3 | 7.9 | 8.7 | 6.4 | 9.8 | 7.8 |
| Modulus 300% (MPa) | 19.4 | 19.8 | 12.8 | 14.8 | 10.9 | 15.9 | 13.1 |
| Elongation at break (%) | 426 | 443 | 571 | 490 | 551 | 508 | 499 |
| Shore A | 70 | 72 | 70 | 69 | 64 | 73 | 67 |
| Rebound (%) | 46.2 | 41.4 | 41 | 47.4 | 51.3 | 42.9 | 51.8 |
| Electrical resistivity (Ohm · cm) | 600 · $10^3$ | 240 · $10^3$ | 12.5 | 1.4 | 106 | 165 · $10^3$ | |

TABLE 6

| Battery evaluation* | Carbon black-Example 4 | Battery carbon black-Super P |
|---|---|---|
| Open circuit voltage (V) | 1.652 | 1.654 |
| Short circuit current (A) | 9 | 10.7 |

TABLE 6-continued

| Battery evaluation* | Carbon black-Example 4 | Battery carbon black-Super P |
|---|---|---|
| Time to 1.1 V (hours) | 7.42 | 8.53 |
| Time to 0.9 V (hours) | 11.63 | 12.63 |

*R20 type battery having the following composition:
MnO2- 50.73%
NH4Cl- 1.92%
Carbon black- 10.79%
ZnO- 0.64%
ZnCl2- 9.27%
H20- 26.63%
HgCl2- 0.03%

The invention claimed is:

1. A method for producing carbon black or carbon containing compounds by conversion of a carbon containing feedstock, the method comprising:
    generating a plasma gas by directing a plasma gas supply through an electrical arc in a plasma generating zone;
    guiding the plasma gas through a venturi having a diameter that narrows in the direction of flow of the plasma gas;
    guiding the plasma gas into a reaction area wherein no significant recirculation into the plasma generating zone occurs;
    injecting a carbon containing feedstock into the plasma gas in the reaction area;
    recovering from the reaction area reaction products; and
    separating carbon black or carbon containing compounds from the other reaction products.

2. The method of claim 1, wherein the electric arc is created by at least three electrodes.

3. The method of claim 2, wherein the electric arc is a compound arc.

4. The method of claim 2, wherein the arc is created by connecting an AC power source to electrodes.

5. The method of claim 4, wherein a current frequency of the AC power ranges from about 50 Hz to 10 kHz.

6. The method of claim 2, wherein the plasma gas is injected axially above the center of the electrodes, in order to pass directly through an arc in the arc zone.

7. The method of claim 1, wherein the plasma gas is generated with electrodes comprising graphite.

8. The method of claim 1, wherein the venturi comprises graphite at its inner surface.

9. The method of claim 1, wherein the venturi is formed as a continuous or stepped cone.

10. The method of claim 1, wherein the venturi has a downstream end which abruptly expands from the venturi throat.

11. The method of claim 1, wherein the carbon containing feedstock is selected from one or more of methane, ethane, ethylene, acetylene, propane, propylene, heavy oil, waste oil, pyrolysis fuel oil and mixtures thereof, and wherein the feedstock is fed with or without a carrier gas and with or without preheating.

12. The method of claim 1, wherein the carbon containing feedstock is a solid carbon material injected together with a carrier gas and wherein the carbon containing feedstock is selected from one or more of carbon black, acetylene black, thermal black graphite, coke and mixtures thereof.

13. The method of claim 12, wherein a plasma gas flow rate is adjusted, depending on the nature of the plasma gas and the electrical energy, between 0.001 $Nm^3/h$ to 0.3 $Nm^3/h$ per kW of electric power.

14. The method of claim 1, wherein metal catalyst is added to the carbon containing feedstock.

15. The method of claim 1, wherein a gas to produce the plasma gas comprises one or more of hydrogen, nitrogen, argon, carbon monoxide, and helium.

16. The method of claim 1, wherein the carbon containing feedstock is a hydrocarbon and the temperature in the reaction area ranges from about 900° C. to about 3000° C.

17. The method of claim 1, wherein the carbon containing feedstock is a solid carbon and the temperature in the reaction area ranges from about 3000° C. to about 5000° C.

18. The method of claim 1, wherein a portion of the reaction products in the form of an off-gas is recycled and said portion of the recycled gas is then used as at least a portion of the gas for generating the plasma gas and wherein there is no significant recirculation of said portion of the reaction products in the form of an off-gas into the plasma generating zone.

19. The method of claim 1, wherein the carbon containing feedstock is injected through at least one injector.

20. The method of claim 1, wherein the carbon containing feedstock is injected towards a center of the plasma gas flow.

21. The method of claim 1, wherein the carbon containing feedstock is injected into an outer zone of the plasma gas flow.

22. The method of claim 1, wherein the method is carried out in the absence of oxygen.

23. The method of claim 1, where the method is carried out in the presence of a small quantity of oxygen having an atomic weight ratio of oxygen:carbon of less than 1:6.

24. The method of claim 1, wherein the method is carried out in the presence of an added alkali to decrease structure.

25. The method of claim 1, wherein the reaction products comprise at least one material selected from: carbon black, fullerenes, and hydrogen.

26. A reactor to carry out the process of claim 1, the reactor comprising:
    a head comprising
        at least two electrodes and
        a gas supply;
    the electrodes creating an electric arc between the electrodes when a sufficient electric power is supplied into which the gas from the gas supply can be fed to generate a plasma gas;
    the head being connected to a venturi, the venturi being connected to a reaction section and disposed between the reaction section and the head and, the venturi having a diameter that narrows as it extends from the head to the reaction section;
    at least one feedstock injector for injecting feedstock gas into the reaction section.

27. The reactor of claim 26, wherein the reaction section has a substantially interior cylindrical shape.

28. The reactor of claim 26, wherein the head, venturi and reaction section are fabricated from graphite containing a high temperature resistant material.

29. The reactor of claim 26, wherein the reaction section comprises a chamber with a height between 1.5 and 5 m and a diameter between 20 and 150 cm.

* * * * *